United States Patent [19]

Eggert

[11] 4,092,813
[45] June 6, 1978

[54] EDGE PROTECTOR TRIM STRIP

[75] Inventor: Frank Eggert, Hamburg, Germany

[73] Assignee: Schlegel (UK) Limited, Seacroft Leeds, England

[21] Appl. No.: 737,608

[22] Filed: Nov. 1, 1976

[51] Int. Cl.² .................. E04B 1/62; E04F 15/14
[52] U.S. Cl. ........................ 52/397; 52/716; 52/403
[58] Field of Search ............... 52/716, 717, 395–398, 52/403; 49/490, 491

[56] References Cited

U.S. PATENT DOCUMENTS

| 3,442,059 | 5/1969 | Kessler | 52/403 |
| 3,545,157 | 12/1970 | Cziptschirsch et al. | 52/717 |

FOREIGN PATENT DOCUMENTS

| 724,943 | 1/1966 | Canada | 52/309 |
| 831,286 | 1/1970 | Canada | 52/309 |
| 1,586,491 | 2/1970 | France | 49/490 |

Primary Examiner—James L. Ridgill, Jr.
Attorney, Agent, or Firm—Cumpston & Shaw

[57] ABSTRACT

An edge protector trim strip for application to a flange such as that found around door openings on motor vehicles, the strip having a body of generally U-shaped cross-section formed of rubber or plastics material stiffened by a semi-rigid carrier and having throughout its length at least one gripper fin on the internal face of one of the arms of the U and at least two gripper fins of softer material than said at least one gripper fin on the other arm of the U, in which at least an outer portion of said at least one gripper fin is formed of a softer material than the main part of said fin.

3 Claims, 1 Drawing Figure

U. S. Patent   June 6, 1978   4,092,813
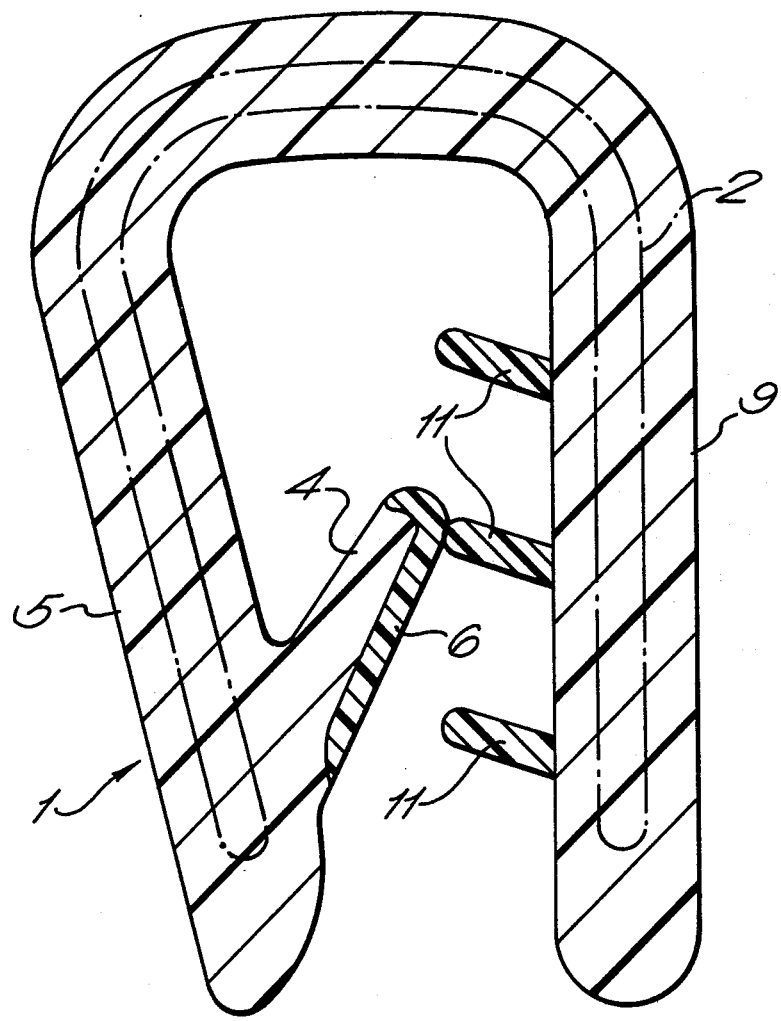

EDGE PROTECTOR TRIM STRIP

This invention relates to an edge protector trim strip for application to a flange, e.g. of metal or fibreglass, such as is found in motor cars around door apertures, boot apertures and the like.

The present invention is an improvement over known edge trim strip, in that it gives an improved ratio in the push on/pull off forces for fitting and removing the strip to and from a flange and forms an excellent seal with the flange to keep out water.

According to the present invention, we provide a one-piece edge protector trim strip for application to a flange such as that found around door openings on motor vehicles, said strip having a body of generally U-shaped cross-section, formed of polymeric material such as rubber or plastics, stiffened by a simi-rigid carrier, the strip having throughout its length a plurality of resiliently deformable gripper fins extending from the arms of the U inwardly thereof towards the base of the U, there being at least one gripper fin on one of the arms of the U and at least two gripper fins of softer material than said at least one gripper fin, on the other arm of the U, the said two fins of softer material being extruded in one piece with the remainder of the strip, and wherein a minor portion of said at least one gripper fin on one of the arms of the U is formed of a softer material than the major portion.

Preferably, at least part of the surface of said at least one gripper fin facing the mouth of the U has a thin layer of said softer material which functions as an anti-sliding surface. The said softer layer may be extended around the tip of said at least one gripper fin.

A preferred embodiment of the present invention is now described with reference to the accompanying drawing, which is an enlarged sectional view of an edge protector trim strip.

Referring to the drawing, a dual durometer extruded trim strip for application to a metal flange is shown, the trim strip having a generally U-shaped body 1 which is formed of a plastics or rubber material which is extruded over a semi-rigid carrier 2 of known construction such as a U-shaped knitted wire carrier or a U-shaped stamped metal carrier traditionally used in edge protector trim strips.

In accordance with the present invention, one arm 5 of the body 1 has throughout its length an inwardly directed gripper fin 4 which is formed largely of the same plastics or rubber material as the body 1 but which has on its outer face, i.e. on the face directed towards the open end of the U, a thin covering layer of softer plastics or rubber material 6 which acts as an anti-sliding surface. This material 6 may extend (as shown) at least partly around the free end of the fin 4, and preferably (as shown) does not extend quite to the base of the fin 4. The other arm of the body is provided with at least two (three as shown are preferred) inwardly directed gripper fins 7 which are made of a softer material than that from which the major portion of the fin 4 is made and which is preferably of the same soft material as the material 6.

In the majority of prior art trim strips, the force needed to apply the trim strip to a flange is greater than the force needed to remove that trim strip from the flange. However, the trim strip the subject of our U.K. Pat. Specification No. 1,456,086 requires considerably less force to apply it to a flange than to remove it from a flange, the ratio being around 2:3. The trim strip of the present invention has been designed to improve this ratio even more to bring it in the region of about 1:2 and preliminary tests have shown that the portion of softer material 6 has given the strip a performance in this region. The reason why this occurs is because the softer material of the portion 6 acts as an anti-sliding surface, thereby increasing the friction between the fins 4 and 11 and the flange when an attempt is made to remove the strip from the flange, but friction is not increased during application of the strip to the flange because the fins 11 can collapse to allow passage of the flange. Of course, because the major portion of the fin 4 is still formed of the harder material, only the fins 11 will be caused to collapse to a very large extent as in the construction of our U.K. Pat. Specification No. 1,456,086. Not only does this maintain the frictional forces between the fins and the flange at a near maximum, but also it ensures that the three fins 11 press hard against the flange so as to prevent ingress of water.

It is envisaged that instead of providing a portion of softer material 6 over the whole outwardly-facing face of the fin 4, it could be provided on only the inner part of the fin and it is even envisaged that just the tip of the fin 4 could be made of the softer material.

What is claimed is:

1. A one-piece edge protector trim strip for application to an applied position on a metal flange or the like such as that found around door openings on motor vehicles, said strip having a body of generally U-shaped cross section, formed of polymeric material, and resiliently deformable gripper fins extending from the arms of said U-shaped body inwardly thereof throughout the length of said strip, wherein said gripper fins comprise a first single deformable gripper fin on one of the arms of said U-shaped body in which the major portion of said first fin is formed of a first deformable material of one hardness, and a plurality of gripper fins of a second deformable material softer than said first deformable material on the other arm of said U-shaped body whereby said plurality of gripper fins are collapsed when said trim strip is in its applied position for accommodating flanges of different thicknesses, preventing ingress of water into said trim strip, and presenting anti-sliding friction surfaces in engagement with the flange for resisting removal of said trim strip from the flange, and wherein a minor surface portion of said first gripper fin facing said plurality of gripper fins is of a third deformable material softer than said first deformable material and cooperates with said collapsed plurality of gripper fins to maximize the frictional forces resisting removal of said trim strip from the flange while minimizing the frictional forces resisting application of said trim strip on the flange.

2. A one-piece edge protector trim strip as claimed in claim 1 wherein said minor surface portion comprises substantially the entire surface of said first gripper fin facing said plurality of gripper fins.

3. A one-piece edge protector trim strip as claimed in claim 1 wherein said minor surface portion of said first gripper fin comprises a thin layer of said softer material extending around the tip of said first gripper fin.

* * * * *